United States Patent
Kubota et al.

(10) Patent No.: US 7,583,078 B2
(45) Date of Patent: Sep. 1, 2009

(54) ROTATION ANGLE DETECTING DEVICE AND METHOD OF CORRECTING TEMPERATURE CHARACTERISTIC OF THE SAME

(75) Inventors: Takamitsu Kubota, Kariya (JP); Yoshiyuki Kono, Obu (JP); Tomohiro Ito, Kariya (JP)

(73) Assignee: DENSO Corporation, Kariya (JP)

( * ) Notice: Subject to any disclaimer, the term of this patent is extended or adjusted under 35 U.S.C. 154(b) by 310 days.

(21) Appl. No.: 11/605,400

(22) Filed: Nov. 29, 2006

(65) Prior Publication Data
US 2007/0126419 A1 Jun. 7, 2007

(30) Foreign Application Priority Data
Dec. 6, 2005 (JP) ............... 2005-351667

(51) Int. Cl.
*G01B 7/30* (2006.01)
*G01R 33/07* (2006.01)
(52) U.S. Cl. ............... 324/207.2; 324/207.25; 324/225

(58) Field of Classification Search ...............
324/207.12–207.25, 174, 225; 338/32 R, 338/32 H
See application file for complete search history.

(56) References Cited

U.S. PATENT DOCUMENTS

| | | | | |
|---|---|---|---|---|
| 4,966,041 A | * | 10/1990 | Miyazaki | 73/862.191 |
| 5,550,469 A | * | 8/1996 | Tanabe et al. | 324/251 |
| 6,498,479 B1 | | 12/2002 | Hamaoka et al. | |
| 7,298,395 B2 | * | 11/2007 | Fukaya et al. | 348/149 |
| 2006/0016427 A1 | * | 1/2006 | Uda et al. | 123/399 |

* cited by examiner

*Primary Examiner*—Jay M Patidar
(74) *Attorney, Agent, or Firm*—Nixon & Vanderhye P.C.

(57) ABSTRACT

A method of correcting temperature characteristic of a rotation angle detecting device that includes a permanent magnet, a magnetic core, a Hall element that rotates relative to the permanent magnet when a rotating object rotates to provide an output signal. The method includes a step of setting temperature correction values for correcting a temperature characteristic of the rotation angle detecting device according to magnetic flux density. The magnetic flux density is divided into a plurality of grade ranges and the temperature correction values are respectively set for the grade ranges.

2 Claims, 4 Drawing Sheets

| GRADE RANGE | 1 | 2 | ... | 19 | 20 |
|---|---|---|---|---|---|
| B | -200~ -180 | -180~ -160 | ... | 160~ 180 | 180~ 200 |
| CORRECT. VALUE | $\alpha 1$ | $\alpha 2$ | ... | $\alpha 19$ | $\alpha 20$ |

ROTATION ANGLE DETECTING DEVICE AND METHOD OF CORRECTING TEMPERATURE CHARACTERISTIC OF THE SAME

CROSS REFERENCE TO RELATED APPLICATION

The present application is based on and claims priority from Japanese Patent Application: 2005-351667, filed Dec. 6, 2005, the contents of which are incorporated herein by reference.

BACKGROUND OF THE INVENTION

1. Field of the Invention

The present invention relates to a rotation angle detecting device that employs Hall elements, whose temperature characteristic can be corrected.

2. Description of the Related Art

A well-known rotation angle detecting device employs one or more Hall elements, which are disposed in a magnetic field formed by a permanent magnet. The Hall elements are arranged to rotate relative to the permanent magnet as a rotating object rotates, so that the output voltage of the Hall elements is generated in response to change in magnetic flux density. The rotation angle of the rotating object is calculated based on the output voltage of the Hall elements. JP-A 2001-124511 or U.S. Pat. No. 6,498,479 B1, which is a counterpart U.S. patent, discloses a rotation angle detecting device in which temperature characteristic of the output voltage of the Hall elements is corrected.

Assuming that: the ambient temperature of the rotation angle detecting device is t; the output voltage of the Hall element under the ambient temperature t is $V_{out}(t)$; the offset voltage of the Hall element when the magnetic flux density is zero is $V_{off}(t)$; and the inclination of the output voltage to the magnetic flux density (herein after referred to as sensitivity) is $S(t)$, the output voltage of the Hall element $V_{out}(t)$ can be expressed as follows.

$$V_{out}(t) = V_{off}(t) + B \times S(t) \quad (1)$$

Usually, temperature characteristic is corrected by setting the sensitivity $S(t)$, which is set at a specific magnetic flux density.

However, it is difficult to accurately correct the temperature characteristic of the Hall element disposed in the magnetic field of a magnetic flux density that is different from the specific magnetic flux density.

SUMMARY OF THE INVENTION

Therefore, an object of the invention is to provide a method of correcting the temperature characteristic of the Hall element of a rotation angle detecting device.

According to a feature of the invention, a method of correcting temperature characteristic of a rotation angle detecting device that includes field forming means, a Hall element that rotates relative to the field forming means when a rotating object rotates to provide an output signal. The method is comprised of a step of setting temperature correction values for correcting a temperature characteristic of the rotation angle detecting device according to magnetic flux density.

In the above method: the magnetic flux density is preferably divided into a plurality of grade ranges, and the temperature correction values are respectively set for the grade ranges; and the temperature correction value $\alpha(t)$ is defined as follows: $\alpha(t) = V_{sen\text{-}off}(t_0)/V_{sen\text{-}off}(t)$ wherein the ambient temperature of the rotation angle detecting device is t, the output voltage of the Hall element under the ambient temperature t is $V_{out}(t)$, the offset voltage of the Hall element when the magnetic flux density is zero is $V_{off}(t)$, the inclination of the output voltage to the magnetic flux density is $S(t)$, a basic offset voltage under the ambient temperature of $t_0$ is $V_0$, a difference between the basic offset voltage $V_0$ and a current offset voltage $V_{off}(t)$ is $\Delta V_{off}$, $V_{sen\text{-}off}(t)$ is defined as $V_{out}(t) - V_0 = \Delta V_{off}(t) + B \times S(t)$.

Another object of the invention is to provide an improved rotation angle detecting device that can accurately correct the temperature characteristic of the Hall element at every magnetic flux density.

According to another feature of the invention, a rotation angle detecting device for detecting a rotation angle of a rotating object includes magnet field forming means for forming a magnetic field, a Hall element, disposed in the magnetic field to rotate relative to the magnetic field when the rotating object rotates, for outputting voltage according to magnetic flux density of the magnetic field, setting means for setting a temperature characteristic correction value $\alpha_i(t)$ at a temperature (t) for each one of a plurality of grade ranges of the magnetic flux density, a memory for storing the temperature characteristic correction value $\alpha_i(t)$ for each one of a plurality of grade ranges of the magnetic flux density, correction means for correcting the temperature characteristic of the Hall element by the temperature characteristic correction value $\alpha_i(t)$ that corresponds to a magnetic flux density to detect.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A rotation angle detecting device 10 according to a preferred embodiment of the invention will be described with reference to the appended drawings.

Figure 1:
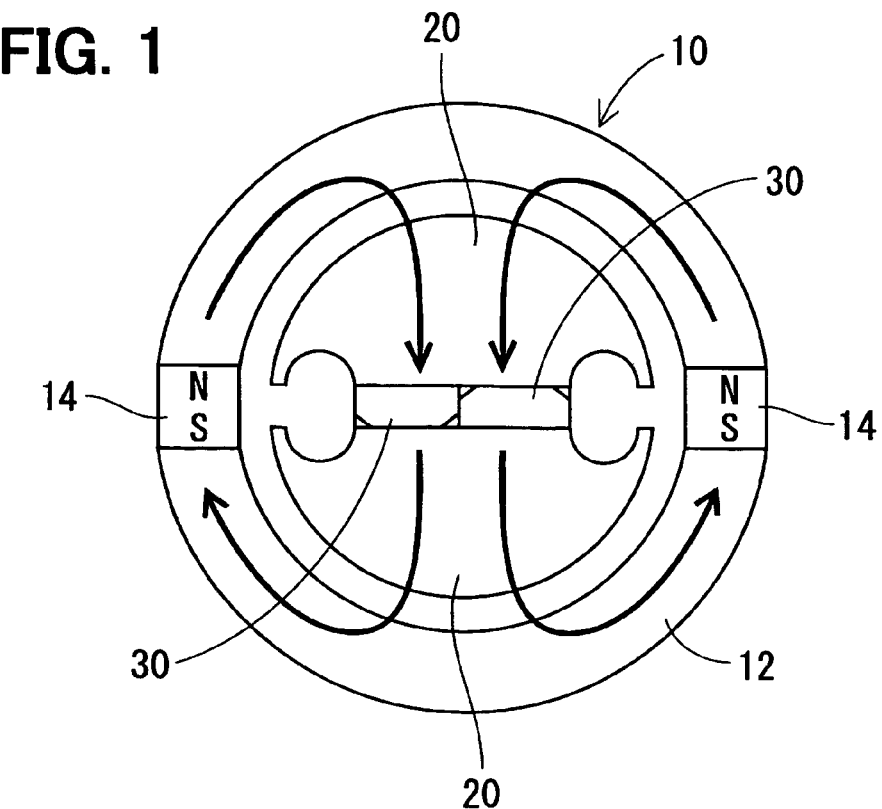
FIG. 1 is a schematic diagram illustrating a rotation angle detecting device according to a preferred embodiment of the invention.
Figure 2:
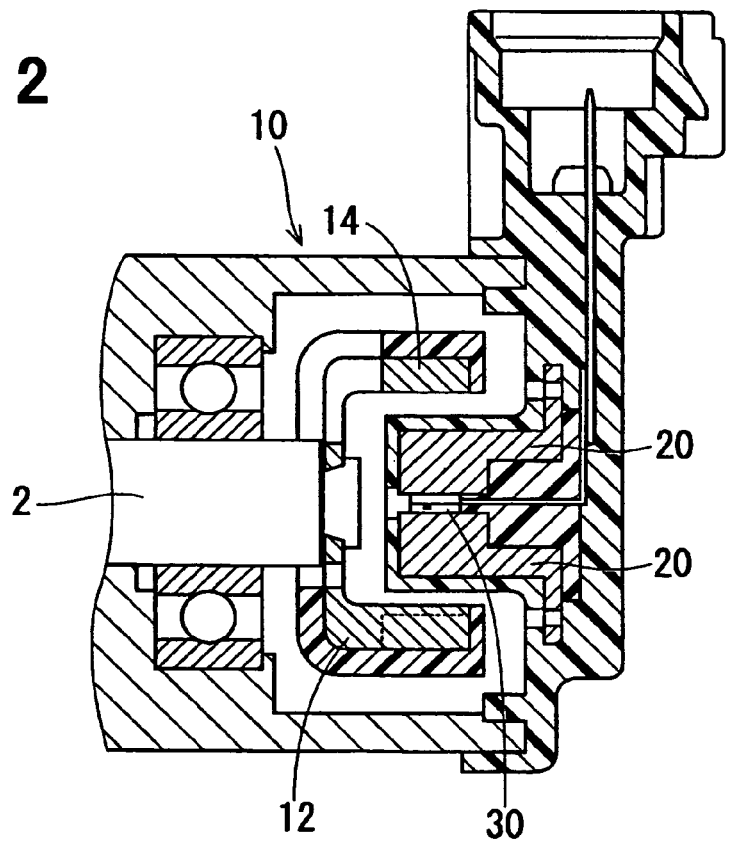
FIG. 2 is a cross-sectional side view of the rotation angle detecting device according to the preferred embodiment.
Figure 3:
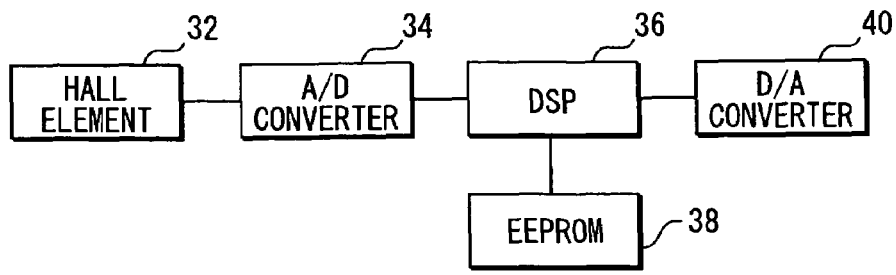
FIG. 3 is a block diagram of a Hall IC chip of the rotation angle detecting device according to the preferred embodiment.

As shown in FIGS. 1 and 2, the rotation angle detecting device 10 according to a preferred embodiment of the invention includes a cylindrical rotor core 12, a pair of permanent magnets 14, a cylindrical stator core 20 and a pair of Hall IC chips 30. The rotor core 12 and the permanent magnets 14 are fixed to an end of a throttle shaft 2 of a throttle device so that they can rotate together with the throttle shaft 2. The permanent magnets 14 are respectively fixed to radially opposite sides of the rotor core 12, thereby forming a magnetic field. The stator core 20 is disposed inside the cylindrical rotor core 12. The Hall IC chips 30 are mounted on the stator core 20 to line up with a diametrical line of the stator core 20 so that one of the Hall IC chips 30 can serve even if the other fails. As shown in FIG. 3, each Hall IC chip 30 includes a Hall element 32, an A/D converter 34, a digital signal processor (DSP) 36, an EEPROM 38 and a D/A converter 40.

The Hall element 32 outputs a voltage signal that corresponds to a component of a magnetic flux density perpendicular to the detecting surface of the Hall element 32. The DSP 36 corrects the temperature characteristic of the digitalized voltage signal of the Hall element 32 according to a temperature characteristic correction valueS(e.g. α(t)) stored in the EEPROM 38. The D/A converter 40 converts the corrected digitalized voltage signal into an analog voltage signal.

Assuming that: a basic offset voltage of the Hall element (when the magnetic flux density is zero and the ambient temperature is $t_0$) is $V_0$; and a difference between the basic offset voltage $V_0$ and other offset voltage $V_{off}(t)$ is $\Delta V_{off}$, the other offset voltage $V_{off}(t)$ of the Hall element (when the magnetic flux density is zero and the ambient temperature is t) can be expressed as follows.

$$V_{off}(t) = V_0 + \Delta V_{off}(t) \quad (2)$$

Accordingly, the expression (1) can be changed as follows.

$$V_{out}(t) = V_0 + \Delta V_{off}(t) + B \times S(t) \quad (3)$$

The above expression (3) can be also expressed as follows.

$$V_{out}(t) - V_0 = \Delta V_{off}(t) + B \times S(t) = V_{sen-off} \quad (4),$$

where $V_{sen-off}$ includes the temperature characteristics of both offset voltage and the sensitivity.

The basic offset voltage $V_0$ is a constant value and can be measured by a test.

A temperature characteristic correction value α(t) can be expressed in the following approximation.

$$\alpha(t) = 1 + a(t-t_0) + b(t-t_0)^2 \quad (5)$$

wherein a and b are set to be 0 before a correction is made.

Figure 4:
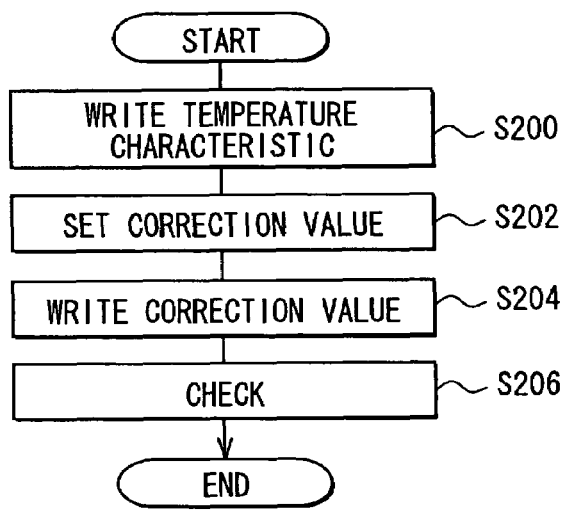
FIG. 4 is a flow diagram of a method of correcting temperature characteristic of a Hall element of the Hall IC chip.
Figures 6, 8:
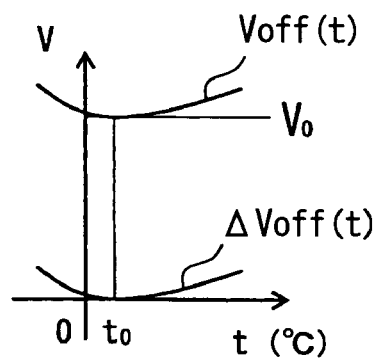
FIG. 6 is a graph showing temperature characteristic curves of offset voltage.
FIG. 8 is a table showing temperature characteristic correction values that are set for plural grade ranges of magnetic flux density.

The temperature characteristic correction value α(t) is set for each grade range of the magnetic flux density, as shown in FIG. 8. As shown in FIG. 4, the temperature characteristic correction values are set as follows. At the first step S200, the basic voltage $V_0$ and the sensitivity S ($t_0$) at each grade range of the magnetic flux density from −200 mT up to 200 mT are measured and stored into one of 20 grade ranges of the EEPROM 38. At S202, temperature characteristic correction values α(t) for each one of a plurality of grade ranges of magnetic flux density is set. At S204, each set temperature correction value α(t) is stored into the EEPROM 38. At S206, the voltage signal $V_{out}(t)$ of the Hall element 32 is measured to examine whether the voltage signal $V_{out}(t)$ is corrected based on the temperature characteristic correction value α(t) or not.

Figure 5:
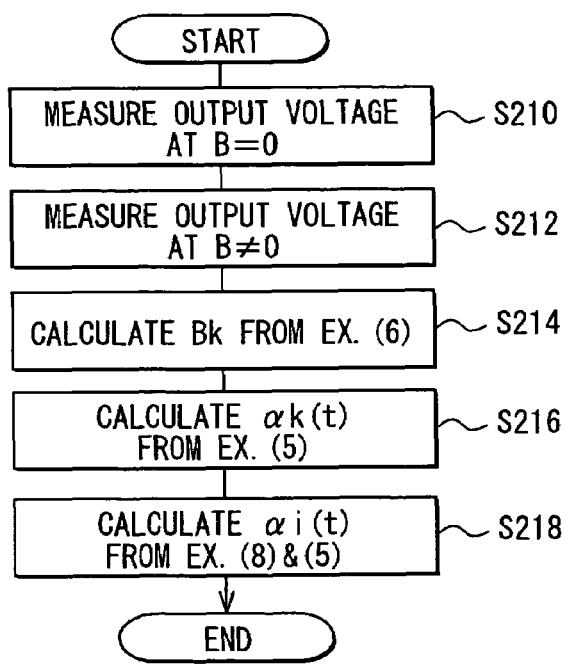
FIG. 5 is a flow diagram for setting a temperature characteristic correction value.

The temperature characteristic correction value α(t) is set according to flow diagram shown in FIG. 5.

At step 210, the output voltage $V_{off}(t)$ of the Hall IC 30 under the magnetic flux density of 0 is measured while the ambient temperature changes from −40 degrees C. up to 120 degrees C. Since the offset voltage $V_0$ at temperature to has been measured at S200, $\Delta V_{off}$ can be obtained from the expression (2).

At S212, a magnetic field of a certain magnetic flux density $B_k$ in one of the grade ranges of the magnetic flux density is given to the Hall IC chip 30 to measure the output voltage $V_{out}(t)$ of the Hall IC ship 30.

Thereafter, the magnetic flux density $B_k$ is calculated from the following expression that is introduced from the expression (1).

$$B_k = (V_{out}(t) - V_0) / S(t_0) \quad (6)$$

Incidentally, $V_{out}(t)$, $V_0$ and $S(t_0)$ are measured beforehand.

At the next step S216, a temperature characteristic correction value at the magnetic flux density of $B_k$ is set in the following manner.

Figure 7A:
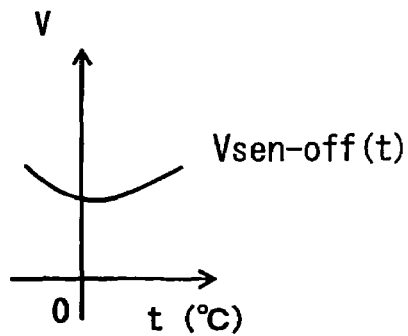
FIGS. 7A, 7B and 7C are graphs showing characteristic curves for calculating the temperature characteristic correction value.
Figure 7B:
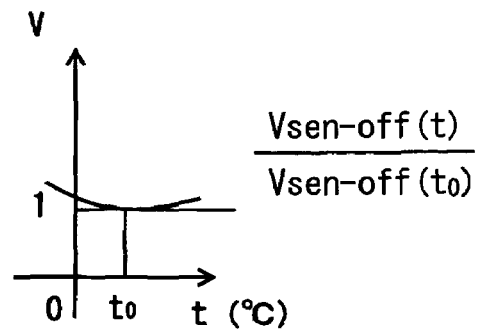
Figure 7C:
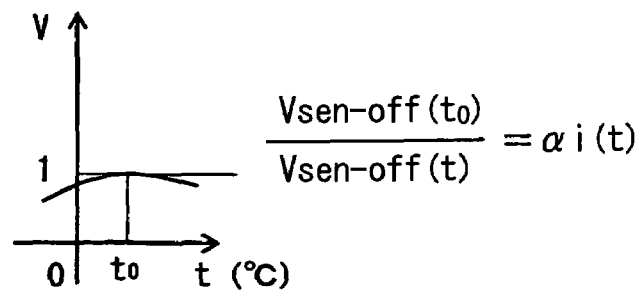

Firstly, $V_{sen}(t)$ when the magnetic flux density is $B_k$ as shown in FIG. 7A is calculated by the expression (4). Secondly, a variable ratio $V_{sen-off}(t)/V_{sen-off}(t_0)$, as shown in FIG. 7B, is calculated. Thirdly, the reciprocal of the variable ratio, which is $V_{sen-off}(t_0)/V_{sen-off}(t)$ at the magnetic flux density of $B_k$ is set as the temperature characteristic correction value $\alpha_k(t)$, as shown in FIG. 7C, to obtain the coefficients a and b from the expression (5).

Then, a temperature characteristic correction value $\alpha_i(t)$ in a grade range other than the grade range that includes the magnetic flux density $B_k$ is obtained.

The following expression can be introduced from the expression (1): $V_{out}(t) - V_{off}(t) = B \times S(t)$.

Therefore, $(V_{out}(t) - V_{off}(t))$ at the magnetic flux density of Bi can be expressed as follows.

$$(V_{out}(t) - V_{off}(t))_{B=Bi} = (V_{out}(t) - V_{off}(t))_{B=Bk} \times B_i/B_k \quad (7)$$

Accordingly, $V_{sen-off}(t)$ under the magnetic flux density of Bi can be obtained by the following expression.

$$V_{sen-off}(t) = V_{out}(t) - V_0 = (V_{out}(t) - V_{off}(t))_{B=Bk} \times B_i/B_k + \Delta V_{off}(t) \quad (8)$$

Accordingly, the coefficients a and b of the temperature characteristic correction value $\alpha_i(t)$ in a grade range other than the grade range that includes the magnetic flux density $B_k$ can be obtained from the expression (5), as shown in FIG. 8.

Incidentally, the DSP 36, which is integrated into the Hall IC chip 30, can be separated from the Hall IC chip 30.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A rotation angle detecting device for detecting a rotation angle of a rotating object comprising:
   magnet field forming means for forming a magnetic field;
   a Hall element, disposed in the magnetic field to rotate relative to the magnetic field when the rotating object rotates, for outputting voltage according to magnetic flux density of the magnetic field;
   setting means for setting a temperature characteristic correction value $\alpha_i(t)$ at a temperature t for each one of a plurality of grade ranges of the magnetic flux density;

a memory for storing the temperature characteristic correction value $\alpha_t(t)$ for each one of a plurality of grade ranges of the magnetic flux density;

correction means for correcting the temperature characteristic of said Hall element by the temperature characteristic correction value $\alpha_t(t)$ that corresponds to a magnetic flux density to detect wherein said setting means sets the temperature characteristic correction value $\alpha_t(t)$ in the following steps:

measuring the output voltage $V_0$ and $V_{off}(t)$ of the Hall element under a magnetic flux density of 0 while the ambient temperature is a preset temperature $t_0$ and a temperature t which changes in a preset range;

obtaining $\Delta V_{off}$ that is a difference between $V_{off}(t)$ and $V_0$;

forming a magnetic field of a certain magnetic flux density $B_k$ as one of the grade ranges of the magnetic flux density;

measuring an output voltage $V_{out}(t)$ when the magnetic flux density is $B_0$;

calculating the magnetic flux density $B_k$ from the following expression: $B_k=(V_{out}(t)-V_0)/S(t_0)$ wherein $S(t_0)$ is an inclination of the output voltage to the magnetic flux density when the temperature is $t_0$;

setting the temperature characteristic correction value $\alpha_k(t)$ to $V_{sen-off}(t_0)/V_{sen-off}(t)$ at the magnetic flux density of $B_k$, wherein $V_{sen-off}(t_0)=\Delta V_{off}(t_0)+B_k \times S(t_0)$ and $V_{sen-off}(t)=\Delta V_{off}(t)+B_k \times S(t)$ and wherein $S(t)$ is the inclination of the output voltage to the magnetic flux density when the temperature is t; and setting a temperature characteristic correction value $\alpha_t(t)$ at the magnetic flux density being Bi by an expression: $V_{sen-off}(t)=(V_{out}(t)-V_{off}(t))_{B=Bk} \times B_i/B_k + \Delta V_{off}(t)$.

2. A method of correcting temperature characteristic of a rotation angle detecting device that includes field forming means for forming a magnetic field, a Hall element that rotates relative to the field forming means when a rotating object rotates to provide an output signal, said method comprising a step of setting temperature correction values for correcting a temperature characteristic of the rotation angle detecting device according to magnetic flux density wherein assuming that: the magnetic flux density is B; the ambient temperature of the rotation angle detecting device is t; the output voltage of the Hall element under the ambient temperature t is $V_{out}(t)$; the offset voltage of the Hall element when the magnetic flux density is zero is $V_{off}(t)$; the inclination of the output voltage to the magnetic flux density is $S(t)$; a basic offset voltage under the ambient temperature of to is $V_0$; a difference between the basic offset voltage $V_0$ and a current offset voltage $V_{off}(t)$ is $\Delta V_{off}$; $V_{sen-off}(t)$ is defined as $V_{out}(t)-V_0=\Delta V_{off}(t)+B \times S(t)$, the temperature correction value $\alpha(t)$ is defined as follows: $\alpha(t)=V_{sen-off}(t_0)/V_{sen-off}(t)$.

* * * * *